Jan. 14, 1947.       F. E. CREVER       2,414,287
SELF-EXCITED SYNCHRONOUS DYNAMOELECTRIC MACHINE
Filed Nov. 25, 1942
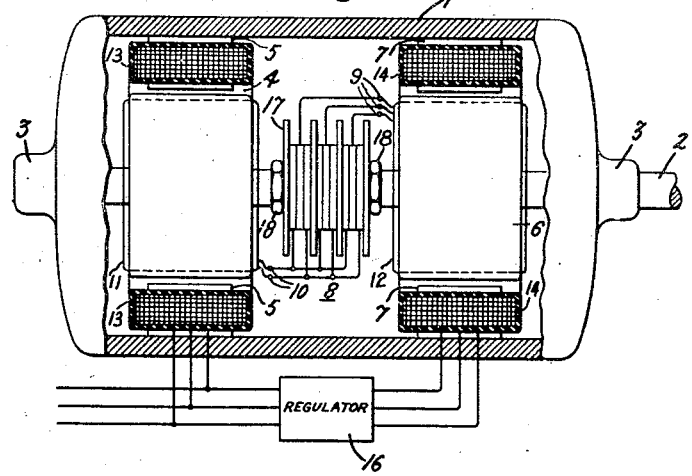
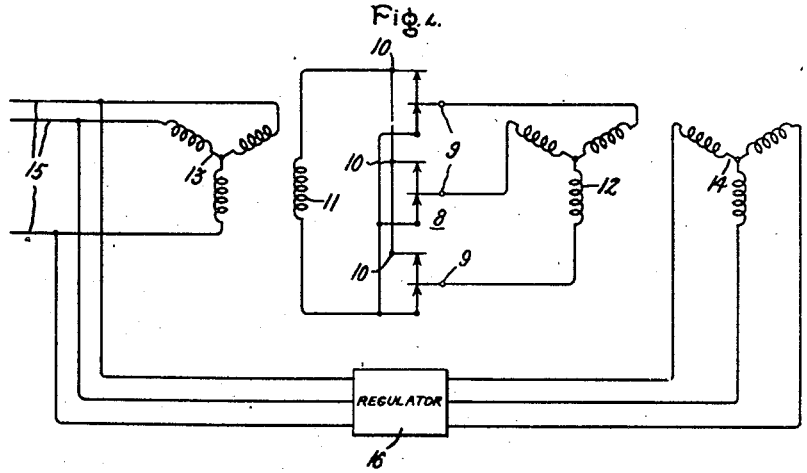
Inventor:
Frederick E. Crever
by Harry E. Dunham
His Attorney.

Patented Jan. 14, 1947

2,414,287

UNITED STATES PATENT OFFICE 2,414,287

SELF-EXCITED SYNCHRONOUS DYNAMO-ELECTRIC MACHINE

Frederick E. Crever, Scotia, N. Y., assignor to General Electric Company, a corporation of New York Application November 25, 1942, Serial No. 466,837

1 Claim. (Cl. 171—119)

This invention relates to dynamo-electric machines and more particularly to improvements in dynamo-electric machine excitation systems.

Most dynamo-electric machines have a stator winding and a rotor winding and they require brushes for completing the electrical connections of the rotor winding. Recent experience has shown that under the low pressure and low temperature conditions prevailing at high altitudes, such as in the substratosphere, brush life is very materially shortened, and in the case of carbon brushes they seem to pulverize and almost melt away very rapidly. However, the need for electric power equipment, particularly dynamo-electric generators, in aircraft is continually increasing and also the working altitude of aircraft is continually increasing so that the problem of brush life is becoming more and more acute.

In accordance with the present invention there is provided a novel and simple arrangement whereby the sliding contacts, such as those occurring between commutators, or slip rings and their brushes are eliminated. The invention is characterized by having the necessary rotor current transformed by induction into the rotor circuit.

An object of the invention is to provide a new and improved dynamo-electric machine.

Another object of the invention is to provide a new and improved excitation system for dynamo-electric machines.

A further object of the invention is to eliminate all sliding contacts in dynamo-electric machines.

Still another object of the invention is to induce the required amount of excitation for an electromagnetically excited synchronous machine into its rotating field winding by transformer action.

The invention will be better understood from the following description taken in connection with the accompanying drawing and its scope will be pointed out in the appended claim.

In the drawing Fig. 1 illustrates schematically an embodiment of the invention and Fig. 2 is a circuit diagram thereof.

Referring now to the drawing, the dynamo-electric machine comprises a housing or casing 1 in which is mounted a shaft 2 by means of end bearings 3. The machine has two separate magnetic circuits, the first of which comprises a rotor 4 and a stator 5 and the second of which comprises a rotor 6 and a stator 7. Both rotors are mounted on the shaft 2, and also mounted on this shaft is a rectifier 8 shown, by way of example, as a dry-contact type rectifier, such, for example, as a well-known selenium disk type rectifier. This rectifier is provided with polyphase input terminals 9 and direct-current output terminals 10.

Mounted on the rotor 4 is a direct-current field winding 11 which is connected across the output terminals 10 of the rectifier and mounted on the rotor 6 is a polyphase primary winding 12 whose terminals are connected respectively to the input terminals 9 of the rectifier.

Mounted on the stator 5 is a main polyphase stator winding 13, and mounted on the stator 7 is a polyphase primary winding 14. An output circuit 15 is connected to the armature winding 13 and the primary winding 14 is connected across the circuit 15, preferably through a suitable regulator 16. The interconnections between the windings 13 and 14 are also arranged so that the phase rotation of the windings 13 and 14 are opposite.

The operation of the illustrated embodiment of the invention is as follows: Assume that shaft 2 is rotated by any suitable means such, for example, as by direct connection to an aircraft engine. The resulting rotation of the rotor 4 will cause its residual magnetism to induce an alternating potential in the armature winding 13. A function of this potential is transmitted to the winding 14 and the resulting current flow in the latter causes it to produce a rotating magnetic field whose direction is opposite to the direction of rotation of the secondary winding 12. Consequently, even at low speed a voltage will be induced in the secondary winding 12 and the frequency of this voltage will be twice the frequency of the voltage in the primary winding 14 by reason of the fact that the windings 11 and 12 rotate at the same speed. That is to say, the speed of the winding 11 determines the frequency of the potential induced in the armature 13 and therefore determines the speed of the rotating field produced by the primary winding 14, while the speed of the secondary winding 12 being the same as the speed of the winding but being in the opposite direction to that of the rotating field produced by the primary winding will have a voltage induced in it of twice the frequency of that induced in the armature winding 13. This polyphase alternating potential induced in the secondary winding is rectified by the rectifier 8 and converted to a unidirectional potential for causing direct current to flow in the field winding 11, thus strengthening the field produced by this winding and further increasing the voltage of the armature 13. Thus, as the speed increases, the strength of the field current increases, and also the frequency of the voltage induced in the secondary winding 12 increases, thus providing a smoother direct-current output from the rectifier 8.

The regulator 16 may be of any suitable type which will control the current in the primary winding 14 so as to regulate any desired output characteristic of the machine. For example, it might be a simple static device in the form of a non-linear impedance which would act in such a manner as to tend to maintain the voltage of the output circuit 15 within reasonably close limits.

The rectifier 8 may conveniently consist of a plurality of rectifier units comprising alternate washers of selenium and nickel-plated iron, these units being separated by suitable conducting washers in the proper locations and suitable insulating washers in the proper locations. In addition, cooling fins 17 in the form of thin larger washers may also be suitably disposed in the stack or pile comprising the entire rectifier unit. Thus, another rectifier assembly may conveniently be clamped on the shaft between a pair of nuts 18 which are threaded onto the shaft. In this manner the rectifier may be made quite small because the windage of the machine produced by its rotation in cooperation with the cooling fins will carry away a substantial amount of heat.

It is not essential that the secondary winding 12 be a polyphase winding and any one of its phases could be used alone as a single-phase secondary winding. However, a polyphase winding is preferable as it will produce a much smoother rectified direct current, thereby materially improving the wave form of the voltage induced in the armature winding 13.

It will be seen from the above description that the windings 11 and 13 constitute a synchronous dynamo-electric machine and that the windings 12 and 14, in effect, constitute a rotary transformer having an output frequency of twice its input frequency. It will, of course, also be noted that all of the rotating parts are interconnected to form a closed excitation circuit to which no brushes or other sliding contacts make connection and that the requisite excitation current which flows in this circuit is induced therein by transformer action from the stationary winding. While the latter winding has been shown by way of example as a polyphase winding connected across the output circuit 15 of the machine so as to make the machine a self-excited system, it will, of course, be understood that such self-excitation is not essential and that winding 14 could be energized by any other suitable source of current supply, either alternating current or direct current.

The above-described machine may be either a motor or a generator.

While there has been shown and described a particular embodiment of this invention, it will be obvious to those skilled in the art that various changes and modifications can be made therein without departing from the invention and, therefore, it is aimed in the appended claim to cover all such changes and modifications as fall within the true spirit and scope of the invention.

What I claim as new and desire to secure by Letters Patent of the United States is:

In a dynamo-electric machine, a rotor shaft, a direct-current field winding on said shaft, a source of alternating potential, and means for rectifying said potential for application to said field winding comprising a dry contact rectifier consisting of a plurality of rectifier washers clamped on said shaft coaxially therewith and having a plurality of conducting and radiating cooling fins clamped between said washers and extending radially from said shaft in parallel planes perpendicular to its axis whereby rotation of said shaft provides for effectively cooling said rectifier washers.

FREDERICK E. CREVER.